(12) United States Patent
Horn

(10) Patent No.: US 8,662,218 B1
(45) Date of Patent: Mar. 4, 2014

(54) MOTORIZED PLATFORM

(76) Inventor: Jerry Dean Horn, Hilliard, OH (US)

( * ) Notice: Subject to any disclaimer, the term of this patent is extended or adjusted under 35 U.S.C. 154(b) by 28 days.

(21) Appl. No.: 13/606,760

(22) Filed: Sep. 7, 2012

Related U.S. Application Data

(63) Continuation-in-part of application No. 12/757,741, filed on Apr. 9, 2010, now abandoned.

(60) Provisional application No. 61/170,513, filed on Apr. 17, 2009.

(51) Int. Cl.
*B62D 51/00* (2006.01)

(52) U.S. Cl.
USPC ........ 180/19.1; 180/19.2; 180/14.2; 180/14.3

(58) Field of Classification Search
USPC .............................. 180/19.1, 19.2, 14.2, 14.3
See application file for complete search history.

(56) References Cited

U.S. PATENT DOCUMENTS

| | | | |
|---|---|---|---|
| 3,369,629 A | 2/1968 | Weiss | |
| 3,655,006 A * | 4/1972 | Cooke | 180/319 |
| 3,704,758 A * | 12/1972 | Cropp | 180/19.1 |
| 4,522,281 A | 6/1985 | Snider | |
| 4,538,695 A | 9/1985 | Bradt | |
| 4,573,549 A | 3/1986 | Pankow | |
| 4,848,504 A * | 7/1989 | Olson | 180/19.1 |
| 4,874,055 A * | 10/1989 | Beer | 180/19.2 |
| 5,307,889 A * | 5/1994 | Bohannan | 180/13 |
| 5,346,028 A * | 9/1994 | Cassano | 180/19.2 |
| 6,139,032 A * | 10/2000 | Hartman | 280/32.7 |
| 6,474,427 B1 * | 11/2002 | Tunnecliff | 180/19.1 |
| 6,659,208 B2 * | 12/2003 | Gaffney et al. | 180/19.2 |
| 6,659,210 B2 * | 12/2003 | Tyson | 180/65.1 |
| 7,958,961 B1 * | 6/2011 | Schade | 180/273 |

* cited by examiner

*Primary Examiner* — Kevin Hurley
*Assistant Examiner* — Michael Stabley
(74) *Attorney, Agent, or Firm* — Roger A. Gilcrest

(57) ABSTRACT

A portable, motorized platform apparatus that attaches to any walk-behind golf club caddy generally comprising: (a) a standing platform body between first and second wheels; (b) a third swivel wheel located to the rear/center of the platform; (c) a chain driven drive tire on the left and a disc brake tire on the right of the first and second wheels; (d) a frame assembly including an extended tongue attached to the platform to the center rear axle/frame; (e) a motor and a rechargeable electrical power supply; (f) split ring clamps attachable to the handle of the caddy, to allow for quick connect of the platform's handle bar assembly; (g) the handle bar assembly comprising a twist throttle and a braking lever; and wherein once the handle bar assembly is attached, the rider is able to steer said platform by using the modified handle of the walk-behind golf club caddy.

10 Claims, 2 Drawing Sheets

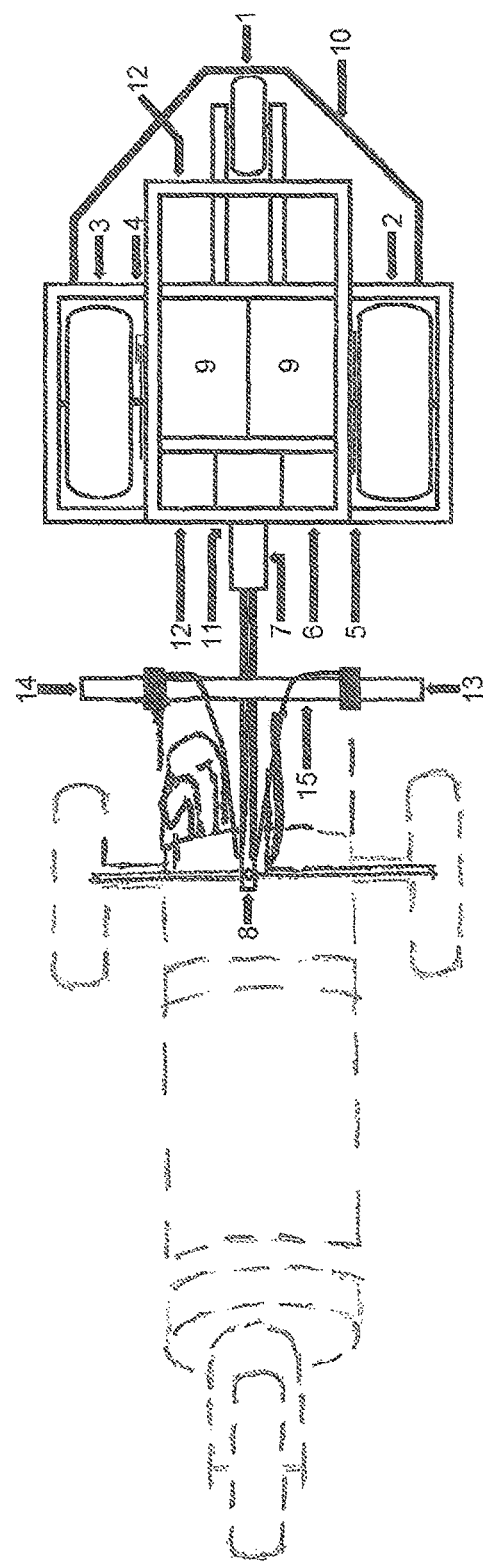

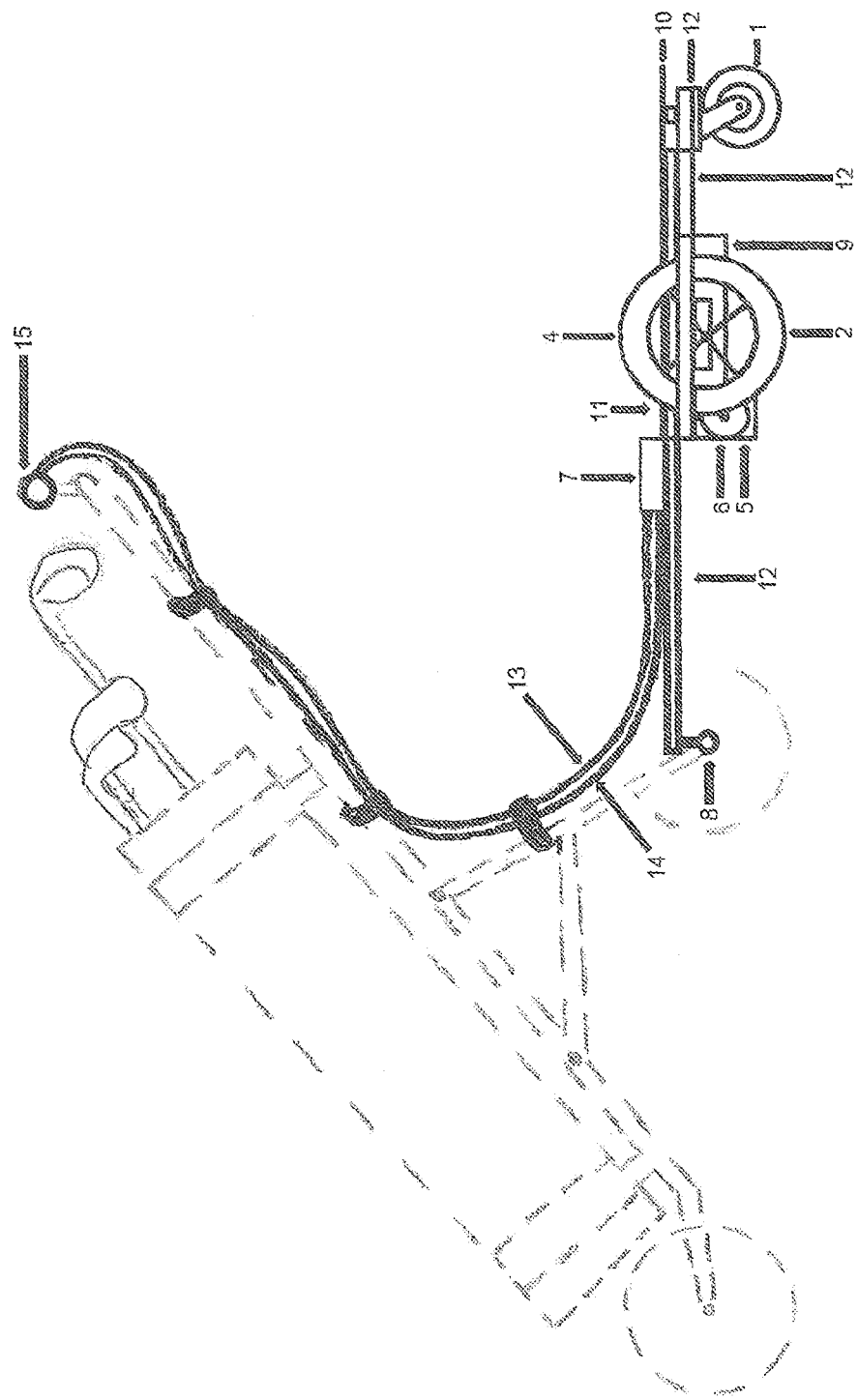
Figure # 2 (side view)

MOTORIZED PLATFORM

RELATED APPLICATION DATA

This application is a Continuation-In-Part of U.S. patent application Ser. No. 12/757,741, filed Apr. 9, 2010, which claims the benefit of U.S. Provisional Patent Application Ser. No. 61/170,513, filed Apr. 17, 2009, which are hereby incorporated herein by reference in their entirety.

FIELD OF THE INVENTION

This invention relates generally to golf carts, and particularly to golf carts of the type that are designed to be stood upon and driven in a manner like that of driving a motorized chariot.

BACKGROUND OF THE INVENTION

As is known, there is a large need for small driven vehicles, which can carry only a single person and a small amount of relatively light cargo. Such vehicles can be used, for example, by messengers, for parts delivery in large industrial plants, or as golf carts. The usual golf cart will accommodate at least two individuals and, as a consequence, is relatively large and bulky, at least too large to be carried in the trunk of an automobile. This means that most golf carts are owned by golf courses or country clubs and rented to players. Furthermore, the size of a conventional golf cart, which is usually battery powered, necessitates the use of a relatively large drive motor and other heavy components, including the batteries. As a result, the initial cost of such carts is high as is the rental which must be charged for their use.

In view of such, there is a need for a lightweight golf cart which will accommodate a single golfer, which can be bought or rented cheaply, and which can be folded and placed in an automobile trunk if desired whereby the golfer can buy their own cart and need not to rent one each time they play.

Attempts have been made to develop small golf carts to provide individual golfers with a motorized means for conveying the golfer and his or her golf bag about a golf course. Exemplary of such attempts are those golf carts shown in U.S. Pat. Nos. 3,369,629, 4,522,281, 4,538,695 and 4,573,549, all of which are incorporated herein by reference. These designs have focused on providing a small, lightweight golf cart that may be collapsed for storage and transportation. Some have also been designed for use by a golfer walking beside the cart as well as riding upon it.

Though the concepts and basic design goals just described have been good, their implementations have not. As a result chariot type golf carts have failed to achieve popularity. Their lack of commercial success has been principally due to the difficulty of devising a golf cart with both the desired degree of versatility and simplicity of design. As a result, some desirable features have almost invariably had to be sacrificed.

For example, the golf cart illustrated in U.S. Pat. No. 3,369,629 does have the attributes of having an articulated handlebar that may be moved between riding, walking and storage positions. It however is essentially a conventional, heavy, seat bearing cart with only side access and which requires the golfer to sit closely aside one or between two golf bags. Also when only one bag is carried, as would often occur with a one-person cart, the center of gravity of the cart is shifted to one side of center line thereby adversely affecting stability. The cart of U.S. Pat. No. 4,522,281 on the other hand is of simpler and of lighter construction in that it does not have a seat and which does provide a detachable club mount that is on center line. It however cannot easily be mounted from the rear nor can it be easily operated while walking.

The cart of U.S. Pat. No. 4,538,695 does have rear mounting, is lightweight and is designed to be operated while walking. These features however are achieved at the sacrifice of center line bag mounting, structural and aesthetic complexity, and an inability to be configured compactly for storage. The U.S. Pat. No. 4,573,549 cart has similar design tradeoffs in that it is without center line bag mounting and walk-beside operative capabilities.

It thus is seen that a need remains for a sulky type golf cart of simple, lightweight and high stability configuration that may easily be configured for storage, riding or walking. It is to the provision of such therefore that the present invention is directed.

SUMMARY OF THE INVENTION

The object of the present invention is to provide a battery-operated, motorized platform that attaches to a new or used existing walk-behind golf caddy by which a handlebar easily attaches to the grip of the walk-behind caddy and consists of a throttle and a brake which controls the operation of the multi-wheeled platform. This allows the golfer to stand and ride on the platform from one shot to the next while using the cart path. The device may or may not remain on the cart path (depending on course conditions) while the golfer goes to the ball location or the golfer can walk beside the device as it pulls itself using the throttle. This device will be useful for those golfers who can't or do not want to walk as much or can't or do not want to rent a golf cart. The device consists of several pieces for ease of transportation and is easy to assemble. This device does not prevent the walk-behind caddy from being utilized in its original state if so chosen.

The purpose of this invention is to provide a platform with multiple wheels attached, propelled by an electric motor by which handle bars are attached easily to an existing walk-behind golf caddy. The left side has a brake cable and a motor inhibit switch, the right side has the throttle which controls the acceleration. The cables may be strapped to the existing walk-behind caddy using hook-and-loop straps. The brake cable goes to one of the wheels, the motor inhibit and throttle cables go to the control console. The console has cables that connect to the battery compartment which is beneath the platform. To attach the platform to the bottom rear of the walk-behind golf caddy a "quick connect" hitch adapter is used. This allows the tongue to be attached to the rear of the walk behind caddy, which allows for 360 degrees of pivoting. The body of the platform (what one stands on) is attached permanently to the tongue. The wheels are held onto the body of the platform similar to a bicycle wheel. The motor drives the wheels. The control console houses the on/off switch and charging port. The control module is mounted underneath the platform next to the batteries.

In general terms, the invention includes a portable, motorized platform apparatus that attaches to any walk-behind golf club caddy, the portable, motorized platform comprising: (a) a standing platform body located between first and second wheels and additionally having a third swivel wheel located to the rear/center of the portable platform; (b) the first and second wheels comprising a chain driven drive tire on the left and a disc brake tire on the right which allows for deceleration and stopping; (c) a frame assembly including an extended tongue with a swivel pin to attach the portable platform to the center rear axle/frame of said walk-behind golf club caddy; (d) a motor and a rechargeable electrical power supply, both mounted below the portable platform; (e) split ring clamps attachable to the handle of the walk-behind golf club caddy, the clamps allowing for quick connect of the portable platform's handle bar assembly; (f) the handle bar assembly comprising a twist throttle on the right which allows for acceleration and a braking lever on the left which controls the disc brake, both are attached to cables which in turn attach to said motor; once said assembly is clamped to said walk-behind golf club caddy handle, the cables are held in place with hook and loop closures on both the frame of the walk-behind golf club caddy and said tongue; once said handle bar assembly is attached, the rider is able to steer said platform by using the modified handle of said walk-behind golf club caddy.

In one embodiment, the platform may be adaptable to any brand of walk-behind golf caddy. Preferable, the hook and loop closures are adjustable to accomplish this adaptability.

The platform of the present invention may further be manufactured of durable lightweight metallic, plastic, or composite materials to reduce the weight of the apparatus.

In another embodiment of the present invention, the tongue assembly can be manufactured so that it can be detached or removed allowing for easy trunk storage or storage in any small space. The removability or detachability of the tongue can be accomplished by attaching the tongue to the apparatus with any fastening means, including removable pins, clamps, or other attachment means.

In another embodiment, the platform is powered by electricity provided by rechargeable, removal battery packs. These can be charged while in the platform or removed and charged in any convenient outlet.

In yet another embodiment, the present invention may further provide easy compartment access to allow for a hidden motor, controller and/or battery pack under the platform.

The present invention also includes an embodiment in which the pivoting hitch and swivel tire allow for easy maneuvering.

It is preferred that the portable motorized platform apparatus of the invention features a relatively low platform for easy access. Preferably, the platform can be adjusted to a specific height setting for the current user. In addition, the present invention may further utilize pneumatic tires. Pneumatic tires, or the equivalent, provide a smoother ride over the uneven surface of a golf course.

In addition, the Portable motorized platform apparatus of the present invention may also function without a rider, such that the use or golfer has the freedom to walk beside the apparatus to get exercise and/or climb hills that are too steep to ride up.

BRIEF DESCRIPTION OF THE DRAWINGS

FIG. 1 is a top plan view of the portable motorized platform apparatus in accordance with one embodiment of the present invention.

FIG. 2 is a side view of the portable motorized platform apparatus in accordance with one embodiment of the present invention.

DETAILED DESCRIPTION OF THE PREFERRED EMBODIMENTS

FIG. 1 is the top view and FIG. 2 is the side view of the device wherein the swivel pin (8) attaches to the tongue of the frame (12). The control console (7) is mounted to the tongue of the frame giving access to the charging port and on/off switch which is all part of the control console (7). The control console (7) and throttle are electrically connected to the controller (11), which supplies voltage from the batteries (9) to the motor (6). The motor (6) is connected to the drive tire (2) by way of the chain (5). To provide braking of the platform, the disc brake (4) is activated by a cable lever on the throttle assembly, which will control the brake tire (3). The platform cover (10) is on top of the frame (12), which allows the rider a solid surface to stand on, and it protects the batteries (9), controller (11), motor (6) and disc brake (4). The swivel tire (1) is attached to the frame (12), which enhances stability and allows it to easily pivot 360 degrees.

The preferred embodiment of the present invention may be made from a commercially available scooter, such as the Schwinn® Scooter™ or otherwise one that may be obtained commercially from Currie Technologies, and identified as Schwinn® Scooter/Currie Technologies and E-zip Electro Drive (www.currietech.com) and E-zip E-900 electric scooter P/N EZ-9008-BL.

The following parts may be obtained from the scooter listed above: 1. Twist throttle and cable (14) (cable was used, but had to be extended), 2. Brake lever (13) (cable was too short, so it was replaced with longer brake cable), 3. Drive tire (2), 4. Chain (5), 5. Brake tire (3) 6. Disc brake (4), 7. Charging port (7) (part of the control console), 8. On/Off switch (7) (part of the control console), 9. Controller module (11) and 10. DC motor (6).

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claims, including the full range of equivalency to which each element thereof is entitled.

What is claimed is:

1. A portable, motorized platform apparatus that attaches to any walk-behind golf club caddy, the portable, motorized platform comprising:
   (a) a standing platform body located between first and second wheels and additionally having a third swivel wheel located to the rear/center of said portable platform;
   (b) said first and second wheels comprising a chain driven drive tire on the left and a disc brake tire on the right which allows for deceleration/stopping;
   (c) a frame assembly including an extended tongue with a swivel pin to attach said portable platform to the center rear axle/frame of said walk-behind golf club caddy;
   (d) a motor and a rechargeable electrical power supply, both mounted below said portable platform;
   (e) split ring clamps attachable to the handle of said walk-behind golf club caddy, said clamps allowing for quick connect of the portable platform's handle bar assembly;
   (f) said handle-bar assembly comprising a twist throttle on the right which allows for acceleration and a braking lever on the left which controls the disc brake, both are attached to cables which in turn attach to said motor;
   wherein once said assembly is clamped to said walk-behind golf club caddy handle, the cables are held in place with hook and loop closures on both the frame of the walk-behind golf club caddy and said tongue;
   wherein once said handle bar assembly is attached, the rider is able to steer said platform by using the modified handle of said walk-behind golf club caddy.

2. A portable motorized platform apparatus of claim 1, wherein the platform is adaptable to any brand of walk-behind golf caddy.

3. A portable motorized platform apparatus of claim 1, wherein the platform is manufactured of lightweight metallic materials.

4. A portable motorized platform apparatus of claim 1, wherein the tongue assembly can be manufactured so that it can be detached allowing for easy trunk storage.

5. A portable motorized platform apparatus of claim 1, wherein the platform is powered by electrical energy.

6. A portable motorized platform apparatus of claim 1, wherein easy compartment access allows for hidden motor, controller and battery pack under the platform.

7. A portable motorized platform apparatus of claim 1, wherein the pivoting hitch and swivel tire allow for easy maneuvering.

8. A portable motorized platform apparatus of claim 1, wherein the platform is low to the ground for easy access.

9. A portable motorized platform apparatus of claim 1, wherein the platform utilizes pneumatic tires.

10. A portable motorized platform apparatus of claim 1, wherein the golfer has the freedom to walk beside the apparatus.

\* \* \* \* \*